(No Model.)  3 Sheets—Sheet 1.
L. DUHAMEL.
APPARATUS FOR STARTING AND PROPELLING WHEELED VEHICLES.
No. 335,062. Patented Jan. 26, 1886.
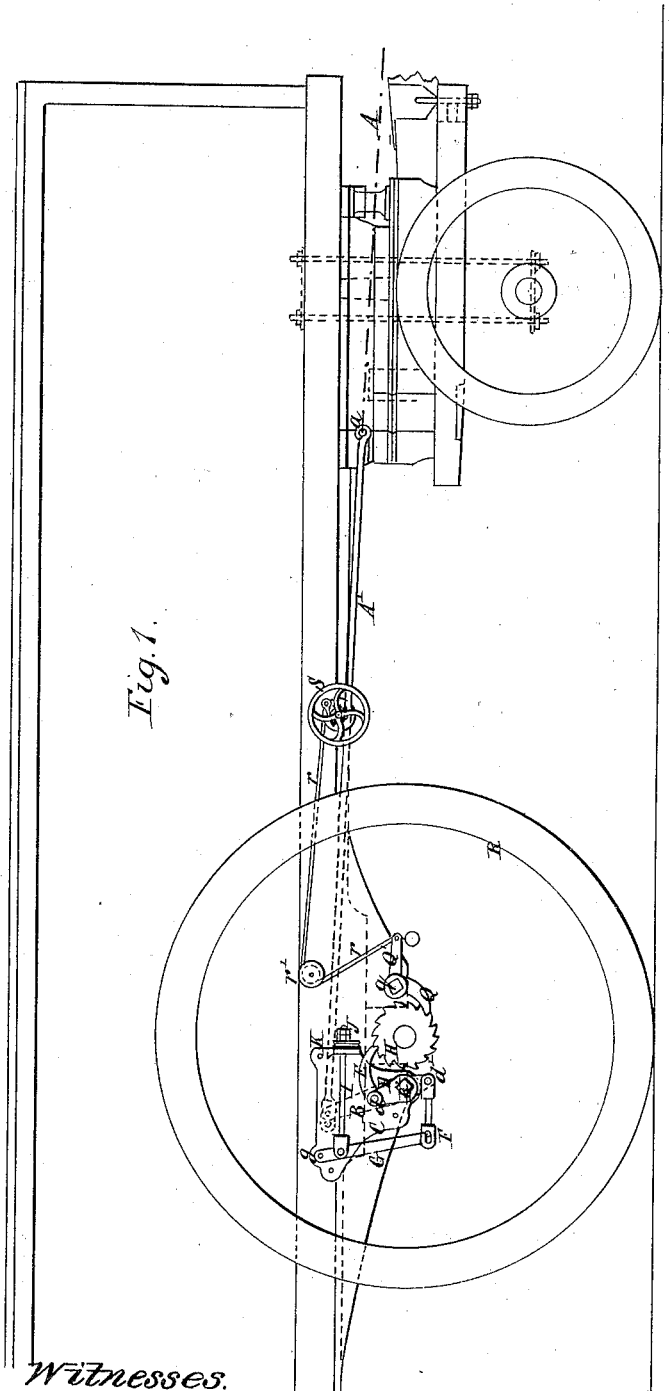
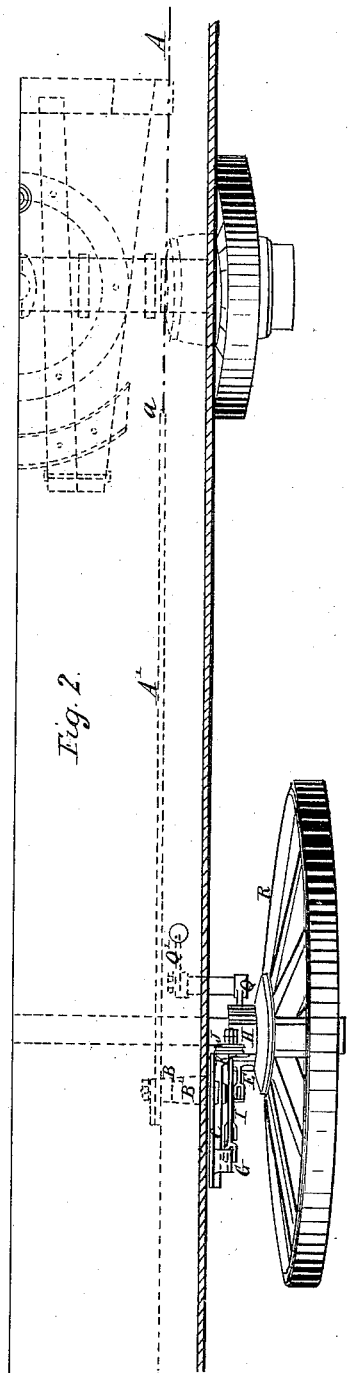

(No Model.)  3 Sheets—Sheet 2.
L. DUHAMEL.
APPARATUS FOR STARTING AND PROPELLING WHEELED VEHICLES.
No. 335,062.  Patented Jan. 26, 1886.
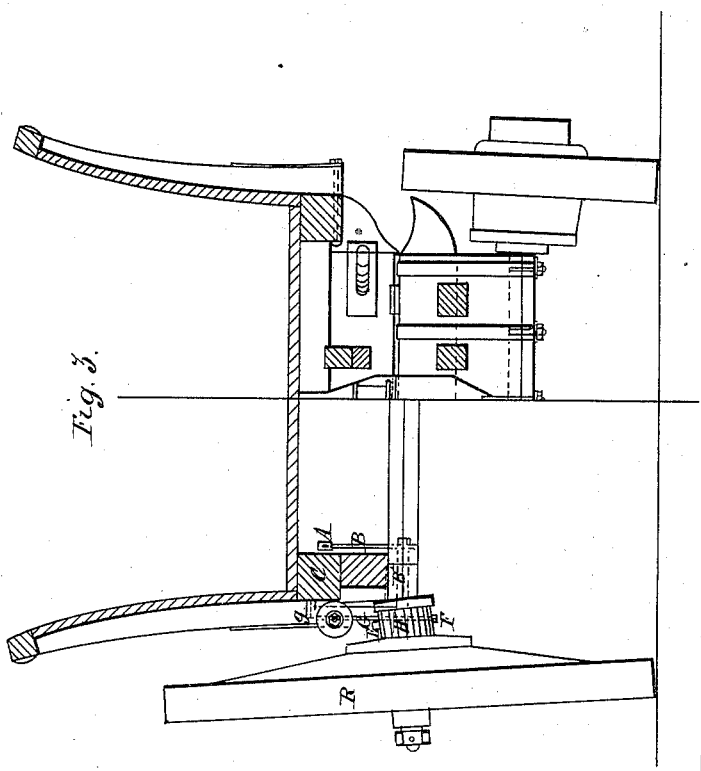
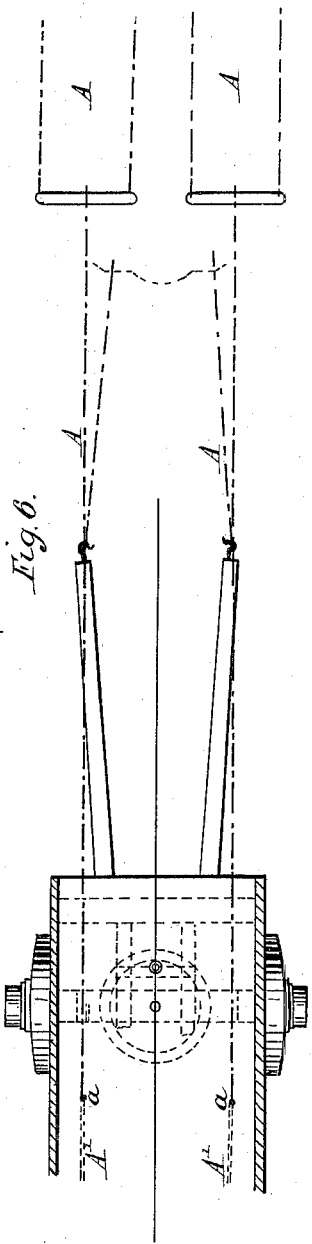

(No Model.) 3 Sheets—Sheet 3.
L. DUHAMEL.
APPARATUS FOR STARTING AND PROPELLING WHEELED VEHICLES.
No. 335,062. Patented Jan. 26, 1886.
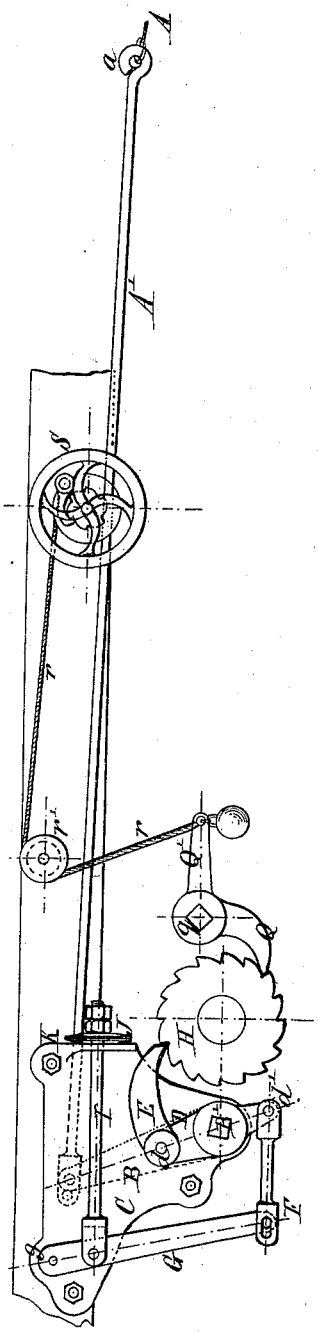
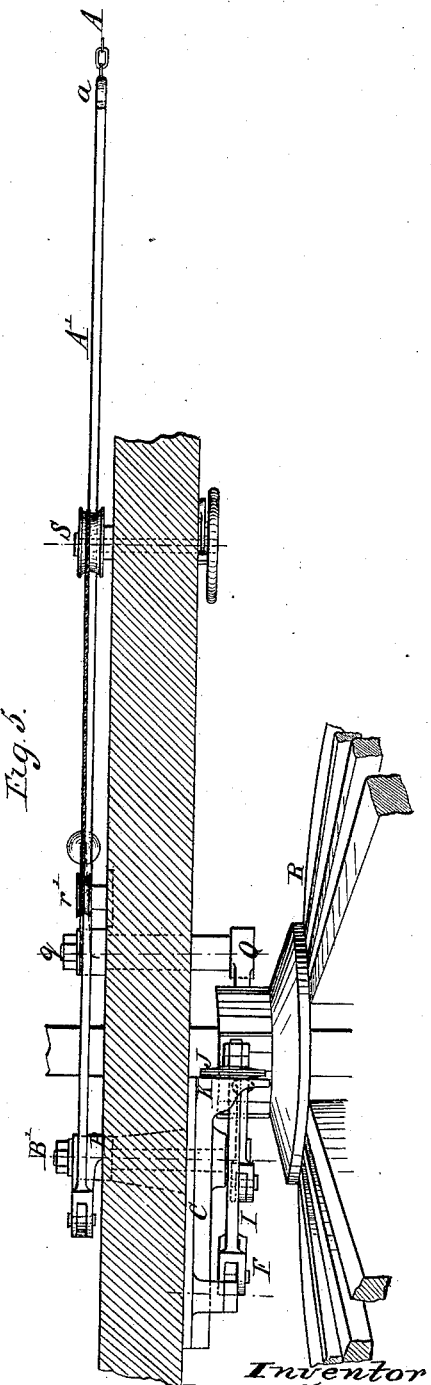
Witnesses.
Inventor
Leon Duhamel,
By James L. Norris.
Atty.

UNITED STATES PATENT OFFICE.

LÉON DUHAMEL, OF PARIS, FRANCE.

APPARATUS FOR STARTING AND PROPELLING WHEELED VEHICLES.

SPECIFICATION forming part of Letters Patent No. 335,062, dated January 26, 1886.

Application filed September 21, 1885. Serial No. 177,709. (No model.) Patented in England July 27, 1885, No. 9,032.

*To all whom it may concern:*

Be it known that I, LÉON DUHAMEL, a citizen of France, residing at Paris, in the Republic of France, have invented a new and useful Improved Apparatus for Starting and Propelling Wheeled Vehicles by Traction, (for which I have made application for a Patent in Great Britain, dated July 27, 1885, No. 9,032,) of which the following is a specification.

In vehicles with four wheels the ordinary mode of applying the traction to the front wheels has the disadvantages that the jolting to which these wheels, which are of comparatively small diameter, are subjected greatly fatigues and injures the horses, in addition to which the power is not applied to the best advantage, as the greater part of the load usually falls upon the hind wheels.

One part of my present invention consists in obviating these disadvantages by applying the traction, as hereinafter described and claimed, to the hind wheels of a vehicle, instead of the front wheels, thus limiting the functions of the latter to the guiding of the vehicle.

According to my invention the traction-traces connect with the wheel-hubs of the hind axle through the medium of a pawl-and-ratchet mechanism, and the traces have no connection with the shafts or pole, so that no draft-strain is imparted to the same.

According to my invention I also provide means whereby at starting a greatly increased power of traction can be exerted, or whereby in certain cases, such as in going up hill, instead of having to apply the traction continuously it can be applied intermittently in jerks with greatly increased force, whereby the horses are much less fatigued, means being provided for preventing at will the backward motion of the vehicle. For this purpose I provide on the naves of the hind wheels of the vehicles ratchet-wheels, in gear with which are pawls carried by double-ended levers on spindles carrying other longer levers, the ends of which are either connected directly to the traces of the horses or to rods that pass to the front end of the vehicle, and are there connected to the traces, so that the pull of the latter upon the levers causes the pawls to act on the ratchet-wheels so as to partially rotate the road-wheels. The levers carrying the pawls are connected by links to springs that draw back the pawls to their original position when the pull upon the traces is relaxed, and thus by a succession of pulls of short duration the horses are enabled to impart to the road-wheels a step-by-step forward motion with greatly increased power, while with a continued pull on the traces the traction will be applied in the ordinary manner to the wheels through the levers. Other pawls pivoted to the framing of the vehicle are made to gear with the ratchet-wheels, so that these cannot turn in the contrary direction, and the vehicle is thus prevented from running down hill when the pull on the traces is relaxed. These pawls have an arm connected to a cord that is wound on a spindle that can be turned by a hand-wheel by the driver when, for the purpose of backing, it is desired to allow of the turning backward of the wheels.

The above-described arrangements for applying increased traction are also applicable to two-wheeled vehicles.

Figure 1 of the accompanying drawings shows a side elevation of a four-wheeled vehicle with my above-described invention applied thereto. Fig. 2 shows a half-plan. Fig. 3 shows a cross section, and Figs. 4 and 5 show views of the mechanism to a larger scale. Fig. 6 shows a plan of the arrangement of the traces when three or more horses are employed.

The traces A are connected at $a$ to rods A', pivoted to the ends of levers B, fixed on rock-shafts B', carried in brackets C, bolted to the framing of the vehicle. The shafts B' also have fixed upon them a double-ended lever, D, the end $d$ of which carries a pawl, E, in gear with a ratchet-wheel, H, fixed on the nave of the wheel R. The other end, $d'$, of the lever D is connected by a rod, F, to the end of a lever, G, pivoted to the bracket C at $g$, and connected by a rod, I, to a disk-spring, J, that bears against a flange, K, on the bracket. Thus when a pull is exerted by the horses on the traces the levers B, to which they are connected, are pulled forward, thus causing the pawls E to act on the ratchet-wheel H, so as to rotate the road-wheels R to a certain extent. On the pull on the levers B being relaxed they, and consequently the pawls E, are drawn back again by the before-described connection with the spring J. A second pawl, Q, pivoted at *q* to the framing, gears with the ratchet-wheel H, so as to prevent the turning backward of the wheel R, a tail, Q', on the lever being connected to a cord, *r*, passing over a guide-pulley, *r'*, and wound on a barrel, S, that can be turned by a hand-wheel, so as to keep the pawl Q out of gear when required.

Having thus described the nature of my invention, and the best means I know for carrying the same into practical effect, I claim—

1. A four-wheeled vehicle having the traction-traces connected with the hind-wheel hubs by a pawl and ratchet, substantially as described.

2. A four-wheeled vehicle having the traction-traces connected with the axle of the hind wheels by a lever and pawl and a ratchet on the wheel-hubs, substantially as described.

3. The combination, with the stationary hind-wheel axle of a four-wheeled vehicle, of hind wheels revolving on said axle, and each having a ratchet-wheel on its hub, brackets connected with the vehicle-body, a shaft carried by the brackets, pawl-levers on said shaft, a second lever on said shaft, and the traction-traces connected with the latter lever, substantially as described.

4. The combination, with the hind axle of a four-wheeled vehicle, of the wheel-hubs provided with ratchet-wheels, the brackets secured to the vehicle-body, a shaft carried by the brackets, the pawl-levers on the shafts, the second levers on said shaft, and the rods attached to the second levers for connecting with the traction-traces, substantially as described.

5. The combination, with the vehicle-body and the wheel-hub having a ratchet-wheel, of the bracket C, the shaft B', the lever B, secured to the shaft, the pawl-lever D, secured to the shaft, the lever G, connected by a link with the pawl-lever, the rod I, connected with said lever G, and the spring J, acting on said rod, substantially as described.

6. The combination, with the wheel-hub having a ratchet-wheel, of a shaft, B', having a lever, B, for connecting with the traction-trace, the pawl-lever D, secured to said shaft for turning the wheel-hub to advance the vehicle, and a second pawl, Q, for engaging the ratchet-wheel to prevent back movement of the vehicle, substantially as described.

7. The combination, with the lever B, shaft B', lever D, and pawl E, of the link F, lever G, rod I, and spring J, substantially as and for the purposes set forth.

8. The combination, with the road-wheel R, of the ratchet-wheel H, pawl Q, cord *r*, and barrel S, rotated by a hand-wheel, substantially as and for the purposes set forth.

9. The combination, with the road-wheel R, of the ratchet-wheel H, pawl E, levers D and B, trace-rod A', pawl Q, cord *r*, and barrel S, substantially as and for the purposes set forth.

In testimony whereof I have signed my name to this specification, in the presence of two subscribing witnesses, this 24th day of August, A. D. 1885.

LÉON DUHAMEL.

Witnesses:
  J. JULES DIGEON, Sr.,
  FERDINAND MOREL.